United States Patent
Brogne et al.

(10) Patent No.: US 7,624,146 B1
(45) Date of Patent: Nov. 24, 2009

(54) METHOD OF MANIPULATING AN ALREADY SENT E-MAIL AND A CORRESPONDING SERVER

(75) Inventors: Nicolas Brogne, Buc (FR); Jean-Pierre Kelles, Liège (BE); Emmanuel Sutter, Rohrwiller (FR); Andreas C. Lemke, Stuttgart (DE)

(73) Assignee: Alcatel, Paris (FR)

( * ) Notice: Subject to any disclaimer, the term of this patent is extended or adjusted under 35 U.S.C. 154(b) by 1555 days.

(21) Appl. No.: 09/667,779

(22) Filed: Sep. 22, 2000
(Under 37 CFR 1.47)

(30) Foreign Application Priority Data

Sep. 24, 1999 (EP) .................................. 99440259

(51) Int. Cl.
G06F 15/16 (2006.01)

(52) U.S. Cl. .................. 709/206; 709/223; 709/227; 707/205; 707/206; 370/463

(58) Field of Classification Search ................ 709/203, 709/206, 218, 220, 222, 224, 225, 228, 230, 709/223, 227, 232; 370/351, 463; 358/442; 705/14; 707/205, 206
See application file for complete search history.

(56) References Cited

U.S. PATENT DOCUMENTS

| | | | | |
|---|---|---|---|---|
| 5,675,733 A | * | 10/1997 | Williams | 709/206 |
| 5,734,901 A | * | 3/1998 | Sidhu et al. | 712/220 |
| 5,870,548 A | * | 2/1999 | Nielsen | 709/217 |
| 5,933,647 A | * | 8/1999 | Aronberg et al. | 717/178 |
| 5,987,504 A | * | 11/1999 | Toga | 709/206 |
| 6,085,244 A | * | 7/2000 | Wookey | 709/224 |
| 6,199,102 B1 | * | 3/2001 | Cobb | 709/206 |
| 6,321,267 B1 | * | 11/2001 | Donaldson | 709/229 |
| 6,327,610 B2 | * | 12/2001 | Uchida et al. | 709/206 |
| 6,370,567 B1 | * | 4/2002 | Ouchi | 709/206 |
| 6,405,243 B1 | * | 6/2002 | Nielsen | 709/206 |
| 6,438,584 B1 | * | 8/2002 | Powers | 709/206 |
| 6,446,115 B2 | * | 9/2002 | Powers | 709/206 |
| 6,842,773 B1 | * | 1/2005 | Ralston et al. | 709/206 |

FOREIGN PATENT DOCUMENTS

| | | |
|---|---|---|
| EP | 0 800 144 A2 * | 4/1997 |
| EP | 0 800 144 A2 | 10/1997 |
| EP | 0 984 593 A1 | 3/2000 |
| JP | 60 085 648 A | 5/1985 |
| JP | 07 131 480 A | 5/1995 |
| JP | 10 107 840 A | 4/1998 |
| JP | 11 068 832 A | 3/1999 |
| WO | WO 99/29073 A | 6/1999 |

* cited by examiner

*Primary Examiner*—Khanh Q Dinh
(74) *Attorney, Agent, or Firm*—Sughrue Mion, PLLC

(57) ABSTRACT

A method of manipulating an already sent e-mail by routing a sent e-mail to a server storing at least the e-mail body and sending only a notification to the addressees. The server associates the e-mail with an access code, which is sent together with the notification, so that the addressees may retrieve the sent e-mail. The sender of the e-mail may access the e-mail body stored at the server to modify or suppress it. The condition for the modification to be accepted by the server is that none of its addressees has read the sent e-mail.

12 Claims, 5 Drawing Sheets

METHOD OF MANIPULATING AN ALREADY SENT E-MAIL AND A CORRESPONDING SERVER

BACKGROUND OF THE INVENTION

The field of the invention is that of features supported by an e-mail system. More precisely, the invention relates inter alia to a method of manipulating already sent e-mails.

In the description below, like in conventional e-mail systems, an e-mail comprises a header and a body. The header contains administrative information for example the e-mail address of the sender, of the addressee(s), the time at which it has been sent. The body contains the text and the formatting of the message itself.

A common method of transmitting an e-mail over a data network is to route the e-mail's header together with the e-mail's body through several nodes of the data network according to the e-mail address of the addressee(s). Different e-mail protocols may be used in different data network. Since the sender and the addressee are not always part of the same network, some e-mail protocol conversion may be operated at gateways during the transmission of the e-mail.

Japanese Patent JP7131480 discloses a mail transmitting and receiving equipment supporting different mail modes: "new mail", "cancel mail", "correction mail". A mail is sent to an addressee accompanied by the mail mode and an identifier. When the mail is received, it is handled according to the mode attached to it. By "new mail", the mail is held together with its identifier in mail holding means. By "cancel mail", the mail having the referenced identifier is deleted from the mail holding means. By "correction mail", the mail having the referenced identifier is replaced by the corrected mail in the mail holding means.

A disadvantage of that solution is that the cancellation or the correction of an e-mail is visible for the addressee. He may for example have already read a mail when a "cancel mail" directed to this mail is received. However, the sender often whishes that the addressee is not informed of the modification.

Japanese Patent JP710107840 discloses an electronic mail system able to manipulate an already sent e-mail. The sender only sends a mail header to the receiver side, the mail body remains stored at the transmitter side. When a change detection section at the transmitter side detects any change of a mail, a mail change information is sent to the receiver side. The mail header corresponding to the mail which has been modified is updated thanks to an change processing section at the receiver side. Depending on a read/unread information, the user at the receiver side is informed of the change state of mails thanks to an appropriate list.

A disadvantage of that solution is that the electronic mail system is highly decentralized. The receiver has to access directly to the sender when he wants to read the body of a mail. The sender has also to be equipped of change detection means which have to check continuously whether a mail has been changed. Such a complexity at the sender is a drawback for private e-mail users.

SUMMARY OF THE INVENTION

A particular object of the present invention is to provide a method of manipulating an already sent e-mail addressed by a sender to an addressee, so that the sender can retract or modify the already sent e-mail as long as the addressee of the e-mail has not accessed it.

This object, and others that appear below, is achieved by a method of manipulating a sent e-mail, addressed by a sender to at least one addressee, the method comprising the steps of: routing a modification message over a data network to a server, on which at least the body of the sent e-mail is stored, the modification message being sent by the sender and dedicated to modify the e-mail body; and modifying the e-mail's body at the server according to the modification message, if the body of the e-mail has not been accessed by any of the addressees.

The object of the invention is further achieved by a server to be part of an e-mail system, the server being able to receive, from a data network, an e-mail addressed by a sender to at least one addressee, the server comprising: means for storing at least the body of the received e-mail together with an access code; means for sending to each addressee a notification message of the e-mail, the notification message containing the access code for accessing the e-mail body; means for handling a status storage indicating at least whether the e-mail body has been accessed by one of the addressees; means for receiving a modification message, dedicated to modify the e-mail body; and means for modifying the e-mail body according to the modification message, if the body of the e-mail has not been accessed by any of the addressees.

The object of the invention is further achieved by a computer program, to be run in particular on a server as mentioned above, the computer program comprising computer program code adapted to perform the steps of: storing the body of a received e-mail together with an access code; sending to each addressee of the e-mail a notification containing the access code for accessing the e-mail body; handling a status storage indicating at least whether the e-mail body has been accessed by one of the addressees; and if a modification message dedicated to modify the e-mail body is received, modifying the e-mail body according to the modification message, if the e-mail body has not been accessed by any of the addressees.

The object of the invention is still further achieved by a computer program comprising computer program code adapted to perform the steps of: composing a modification message, dedicated to modify an e-mail addressed to at least one addressee and sent to a predefined server; and sending the modification message to the server when the program is run on a computer.

The present invention relates to an e-mail system to exchange e-mails over a data network. The e-mail system comprises a server that enables it to manipulate already sent e-mails. The mails are sent to the server which stores the mail body together with an access code and send only a notification containing the access code to the addressee(s) of the corresponding e-mail. The server handles a status storage indicating whether the e-mail has been accessed by at least one addressee. If the server receives a modification message dedicated to modify the stored e-mail body, this modification is executing according to the content of the modification message only if the e-mail body has not been accessed by any of the addressees.

An advantage of the present invention is that the addressee (s) do(es) not notice the manipulation of the e-mail.

Another advantage of the invention is that the server is a centralized unit which executes the manipulation. As a consequence the e-mail program at the senders remains not too complex.

BRIEF DESCRIPTION OF THE DRAWINGS

Other characteristics and advantages of the invention will appear on reading the following description of a preferred implementation given by way of non-limiting illustration, and from the accompanying drawings, in which.

DETAILED DESCRIPTION OF THE INVENTION

Figure 1:
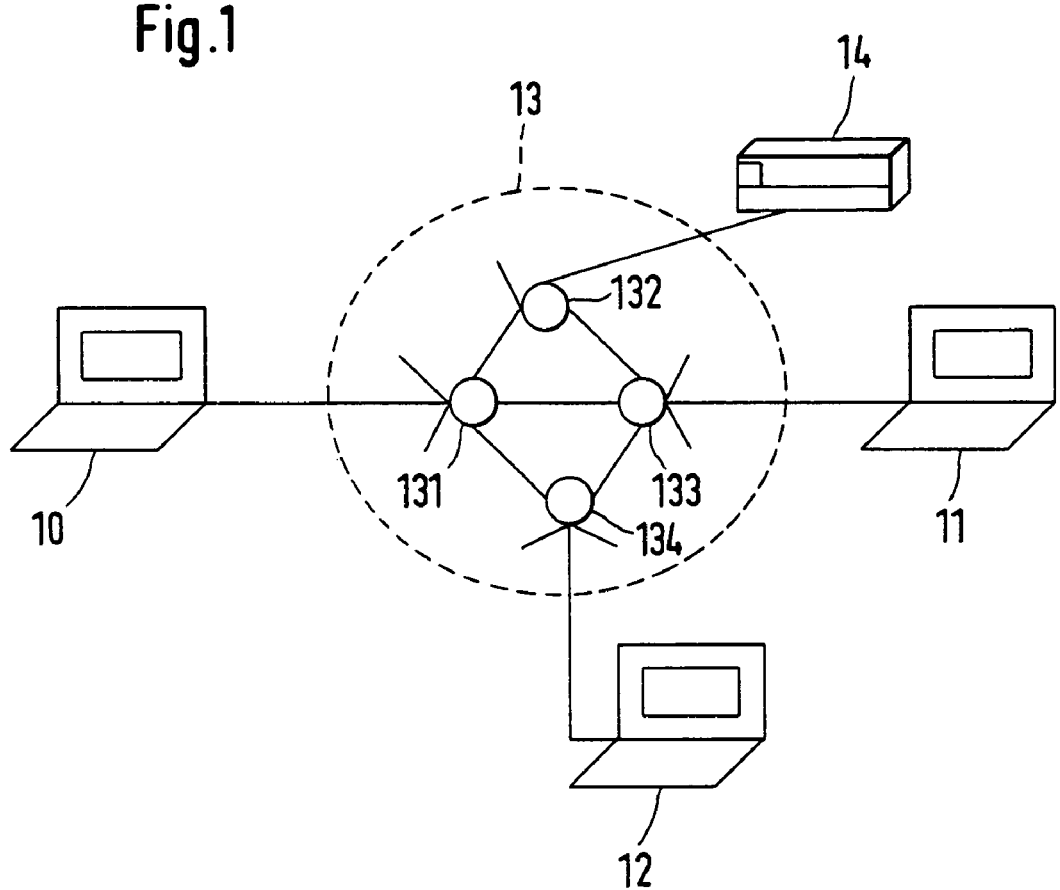
FIG. 1 shows an e-mail system to send e-mails from a sender to addressees over a data communication network comprising a server according to the invention.

FIG. 1 illustrates a system comprising a personal computer (PC) of a sender 10 supporting an e-mail program to send an e-mail to the PC of two addressees 11 and 12. All three personal computer 10, 11, 12 are connected to a data network 13 dedicated to support the transmission of e-mails. The data network 13 comprises nodes 131, 132, 133, 134 dedicated to route the e-mails sent over the data network 13 to the appropriate destination according to e-mail addresses contained in the e-mail header. A server 14 is also connected to the data network 13.

The e-mail program supported by the PC of the sender 10 is, according to the present invention, dedicated to send an e-mail, addressed to the addressees 11 and 12, directly to the server 14 regardless of the addressees specified in the e-mail. The e-mail program at the PC of the sender 10 may for example encapsulate the e-mail in a container e-mail directly addressed to the server 14. The server 14 then retrieves the encapsulated e-mail and handles it.

As introduced above, the terms container e-mail and encapsulated e-mail will be used in the following description to make the difference between the e-mail addressed by the sender 10 to the addressees 11 and 12 (encapsulated e-mail) and the e-mail carrying the encapsulated e-mail to the server 14 (container e-mail). The simplified term e-mail may be used in cases for which the difference between encapsulated and container e-mail is not preventing for properly understanding the purpose.

In a first embodiment, the e-mail program at the PC 10 may enable it to compose two types of e-mails. One type is "new e-mail" the other type is "correction e-mail". This type information may be contained in the container e-mail together with the encapsulated e-mail.

An e-mail of type "correction e-mail" should contain an identifier of the e-mail of type "new e-mail" it relates to. This identifier may be an access code or the header of the corresponding e-mail of type "new mail", which had been sent before. The e-mail of type "correction e-mail" should indicate the part of the corresponding e-mail body to be corrected and the correction to be done. Two possible manipulations are: delete or replace with a new text contained in the encapsulated e-mail body.

In a second embodiment, the e-mail program at the PC of the sender 10 may just be able to compose new e-mails. The user at sender 10 may be able to correct the already sent e-mail by accessing directly the e-mail body stored at the server 14. The access may be a remote access to the server 14 or an access, thanks to a browser, to a Web page containing the e-mail.

When a new e-mail is received at the server 14, the latter sends a first notification e-mail to the PC of addressee 11 over the nodes 132, 133 of the data network 13 and a second notification e-mail to the PC of the addressee 12 over the nodes 132, 133, 134 of the data network 13. The notification e-mail comprises the e-mail address of the sender 10 and an access code to enable the addresses 11 and 12 to access and read the e-mail body stored at the server 14.

For simplification sake, the data network 13 is represented by a unique data network. The invention applies also to a sender 10 and addresses 11, 12 connected to different data networks interconnected with gateways possibly operating e-mail protocols conversion.

The invention applies also, if the e-mail program sends e-mails to an e-mail server gathering all the e-mails sent from a same local area network or sent from customers connected to a some service provider. In that case, the functionality of the server 14 may be included in the e-mail server.

In another preferred embodiment, the e-mail program at the sender 10 may delay the sending of an e-mail toward the server 14. A delay period may be chosen by the user and stored at the sender 10. In that case once the user has pressed a button "send" on the e-mail program interface, the e-mail program stores the e-mail in a list of e-mails waiting for being sent and starts a timer associated to the e-mail. The list of e-mails waiting to be sent is stored at the sender 10. When the timer has exceeded the delay period, the e-mail program sends really the e-mail to the server 14. During the time period when the e-mail is stored in the list of e-mails waiting to be sent, the user at sender 10 may modify or suppress the e-mail by accessing the list of e-mails waiting to be sent.

FIG. 2a describes a detailed structure of a first embodiment of the server 14 showed on FIG. 1. This first embodiment of the server 14 may be thought to cooperate with the second embodiment of the e-mail program at the PC of the sender 10 described above.

The server 14 comprises means 21 for receiving a container e-mail from the PC of sender 10. Means 21 associate an access code to the new received e-mail.

Means 21 are in relation with a database 22 dedicated to store the e-mail body of an e-mail encapsulated in a container e-mail. The structure of a database entry is showed in FIG. 2b.

Each database entry contains an e-mail body field 221, an access code field 222 to store the access code associated to the e-mail and a status storage field 223 indicating, how many addressees have already accessed the e-mail body. In a preferred embodiment, the database entry contains also a field 224 indicating the number of addressees of the e-mail.

Means 21 are connected to means 23 for extracting the e-mail address of all addresses contained in the header of the encapsulated e-mail and sending a notification to each e-mail addressees, so that the addressees are informed that they have been addressed an e-mail. The notification contains the access code to retrieve the e-mail in the database 22 and possibly some information from the encapsulated e-mail header. The notification may be sent by e-mail.

Means 21 are also connected to means 24 for sending the access code to the e-mail sender 10 and to means 25 for sending the result code of a requested modification to the e-mail sender 10. The result code indicates if the modification has been successfully executed or not. The access code as well as the result code may be included in special data packets sent over the Internet and handled at the PC of the sender 10 to pop up a dialog box for the result code or store the access code with the corresponding sent e-mail.

The server 14 comprises means 26 for receiving an "access mail" request sent by an addressee in order to retrieve the e-mail body corresponding to an e-mail the addressee has been notified. The "access mail" request may be a message sent over a data communication network like Internet or World Wide Web. The "access mail" request should contain the access code corresponding to the requested e-mail. The means 26 access the database 22 in order to read the e-mail body associated to the access code and update the status storage. The means 26 are in relation with means 27 to download the e-mail body to the addressee. The e-mail body may be downloaded via a data communication network like Internet or World Wide Web.

The access code may be a pointer to the place where the mail body is stored in the database 22, the address of a web page containing the mail body or a password to access the mail body.

Figure 2:
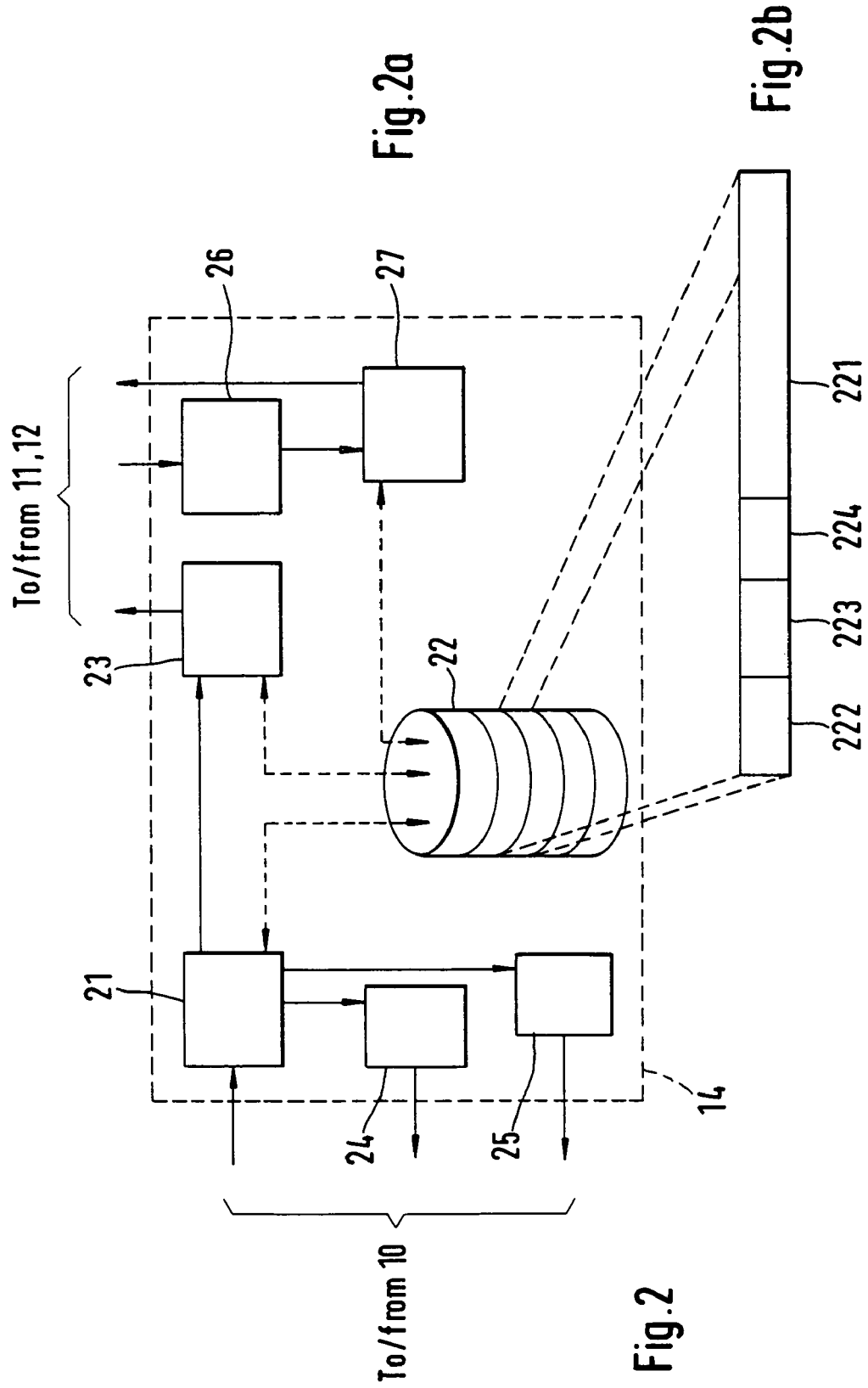
FIG. 2 is a block diagram of an first embodiment of a server according to the invention.
Figure 3:
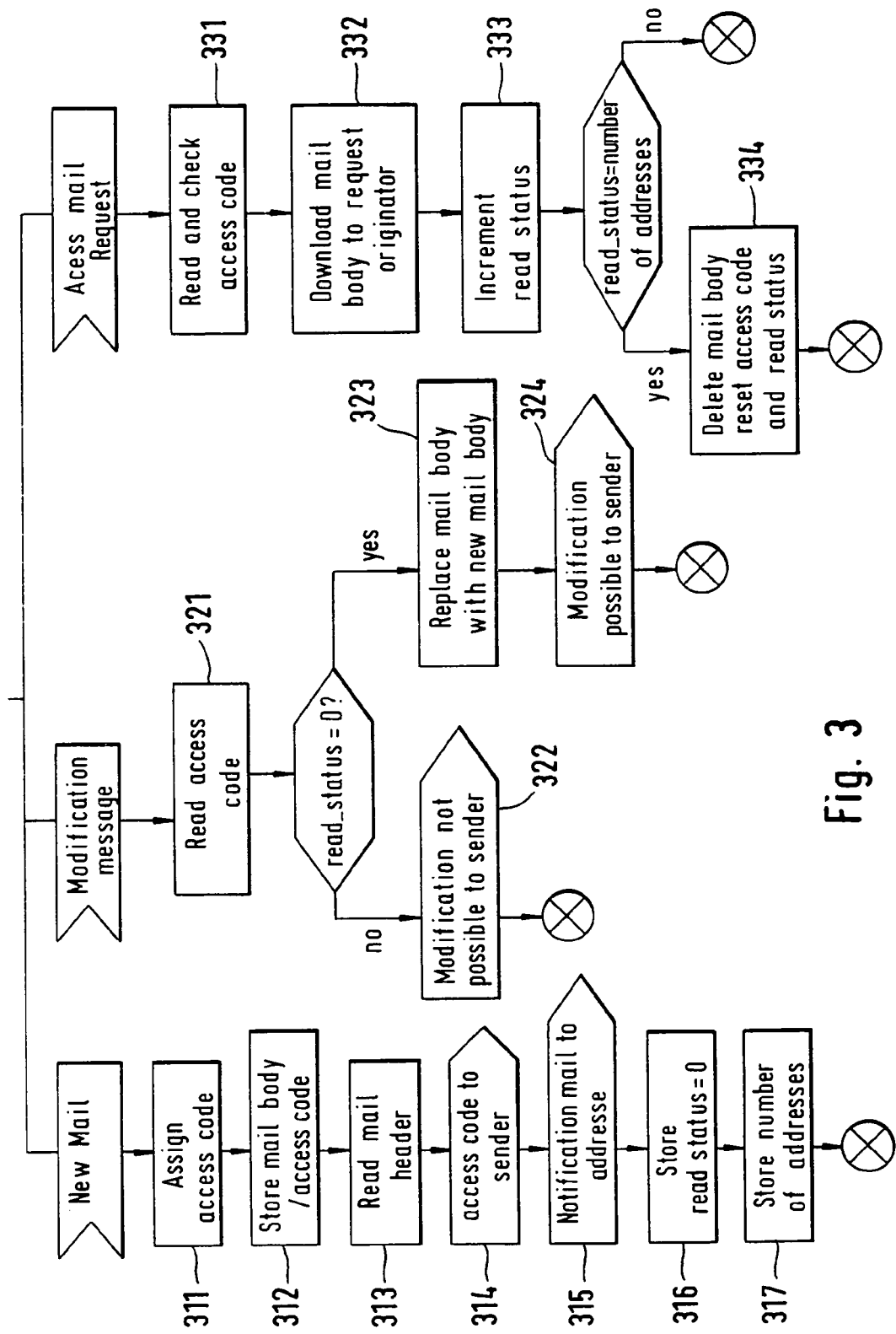
FIG. 3 is a flow chart showing a first implementation of the computer program according to the invention running on the server showed in FIG. 3.

An first implementation of a computer program according to the invention dedicated to run on the server 14 detailed in FIG. 2 is specified thanks to a flow chart showed on FIG. 3. The computer program running on the server 14 is an event-driven program. It handles incoming events like the reception of an e-mail, the reception of a modification message or the reception of an "access mail" request. Once the event has been handled the program returns to an idle state ready to handle a new event.

When a new e-mail is received the program executes the following steps:

Step 311: the program assigns an access code to the received e-mail

Step 312: the program stores the e-mail body in association with the assigned access code in the database 22

Step 313: the program retrieves the e-mail header of the encapsulated e-mail and determines the sender of the e-mail and the e-mail addressees Step 314: the program sends a message containing the access code to the e-mail sender Step 315: the program sends a notification e-mail to the e-mail addressees Step 316: the program stores a status storage initialize with null in the corresponding database entry Step 317: the program stores the total number of addressees this e-mail is addressed to in the corresponding database entry and returns to state idle.

When the stored e-mail body is tried to be accessed by the sender 10 in order to modify it, the program executes the following steps:

Step 321: the program accesses an entry in the database 22 corresponding to the access code contained in the modification message Step 322: the program checks the field status storage in the database entry If the status storage is equal to null, the program executes step 323, if not the program executes step 324 and following.

Step 323: the program sends a message to the sender of the modification e-mail indicating that the modification is not possible and returns to the idle state.

Step 324: the program authorizes the access of the sender 10 to the e-mail body stored in the database so that the sender 10 manipulates the e-mail body and returns to the idle state when the manipulation is completed.

When an "access mail" request is received the program executes the following steps:

Step 331: the program retrieves the access code from the received request and checks if the access code is correct Step 332: the program accesses the entry corresponding to the access code in the database 22 and downloads the e-mail body to the "access mail" request originator Step 333: the program increments the status storage of the corresponding database entry.

Step 334: the status storage is compared to the number of addressees of the database entry. If they are equal, the database entry is deleted and the program returns to the idle state. If they are not equal the program returns directly to the idle state.

A second embodiment of the server 14 according to the invention is showed on FIG. 4a. This second embodiment of the server 14 may cooperate with the first embodiment of the e-mail program at the sender 10 described above.

The server 14 comprises means 41 for receiving a container e-mail from the PC of the sender 10. Means 41 also determine the e-mail type "new mail" or "correction mail". Means 41 associate an access code to the e-mail if the e-mail type is "new mail". Means 41 are in relation with a database 42 dedicated to store information related to an encapsulated e-mail. The structure of a database entry is showed in FIG. 4b.

Each database entry contains an e-mail body field 421, a access code field 422 to store the access code associated to the e-mail and a status storage field 423 indicating if the e-mail body has been accessed by any of the e-mail addressees and a field 424 containing the e-mail header.

Means 41 are connected to means 43 for sending a notification to each e-mail addressees, so that the addressees are informed that they have been addressed an e-mail. The notification contains the access code to retrieve the e-mail in the database 42 and eventually some information from the e-mail header. The notification may be sent by e-mail to the addressees 11 and 12.

Means 41 are also connected to means 44 for sending the result code of a requested modification. The result code indicates if the modification has been successfully executed or not.

The server 14 comprises means 45 to determine the time during which an e-mail associated to a database entry has remained unread by any of the addressees. Means 45 are connected to means 46 for sending automatically an e-mail to the addressees after a predetermined period of time if the e-mail has remained unread. The value of the predetermined period of time may be chosen by the sender 10 and contained in the container e-mail just as the e-mail type. Means 46 access the database 42 to retrieve the required information to construct the automatically sent e-mail.

The server 14 also comprises means 47 for receiving a "access mail" request sent by an addressee in order to retrieve the e-mail body corresponding to an e-mail the addressee has been notified. The "access mail" request may be a message sent over a data communication network like Internet or World Wide Web. The "access mail" request should contain the access code corresponding to the requested e-mail. The means 47 are connected with means 48 for executing an authentication procedure. Means 48 access the database 42 in order to read the e-mail address of the addressees in the stored e-mail header 424 and compare it with the e-mail address of the initiator of the access e-mail message. If the access code and the e-mail address are compatible, means 49 download the e-mail body to the originator of the "access mail" request. The e-mail body may be downloaded via a data communication network like Internet or World Wide Web.

When one of the addressees has accessed the e-mail body at the server 14, the e-mail sender 10 is no more allowed to modify the e-mail body. As a consequence, in a preferred embodiment, means 49 are connected to means 46. Once means 49 have downloaded the e-mail body to one addressee having requested it, means 46 access the database 42 to construct and send automatically an e-mail containing the e-mail body to all the other e-mail addressees. When the e-mails have been automatically sent to all the other e-mail addressees, the corresponding database entry may be deleted.

In a preferred embodiment, the server 14 may comprises means for retrieving information (not showed on FIG. 4) from the database 42. The server 14 may receive a query from the PC of the sender 10 to retrieve all mails sent from sender 10 contained in the database 22. The server 14 may send the result back to the PC of the sender 10. Some extended queries, containing more precise information on the sent e-mails to be retrieved, may be possible. Such a feature may be useful for sender 10 to retrieve already sent e-mails that are not more stored in the list of sent e-mails at its PC.

In another preferred embodiment of the invention the e-mail sender 10 should subscribe to the service proposed by the server 14, to manipulate already sent e-mail. The server 14 may also contain means for charging the e-mail sender 10 when using the service, a monthly fee or a usage fee may be chosen.

Figure 4:
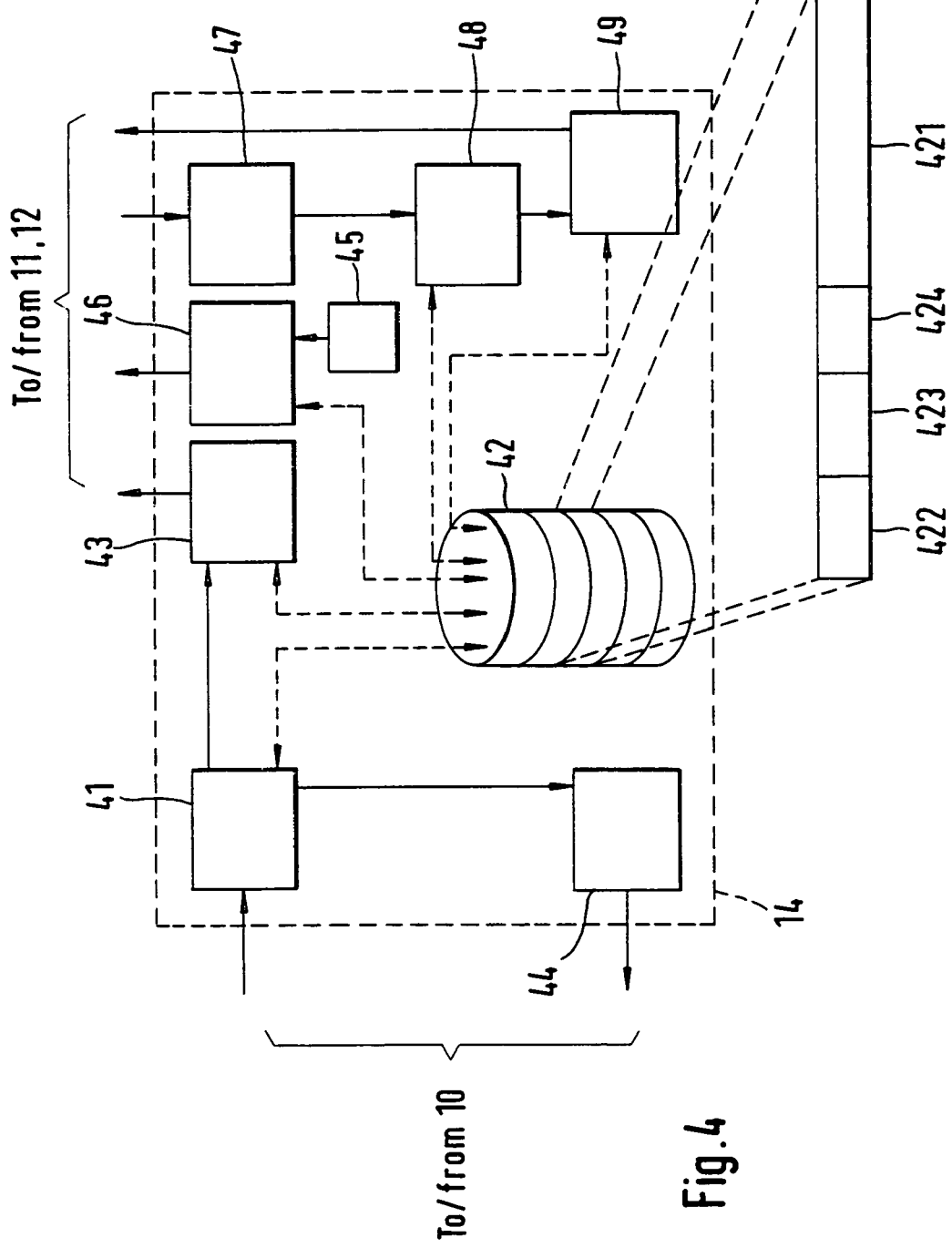
FIG. 4 is a block diagram of an second embodiment of a server according to the invention.
Figure 5:
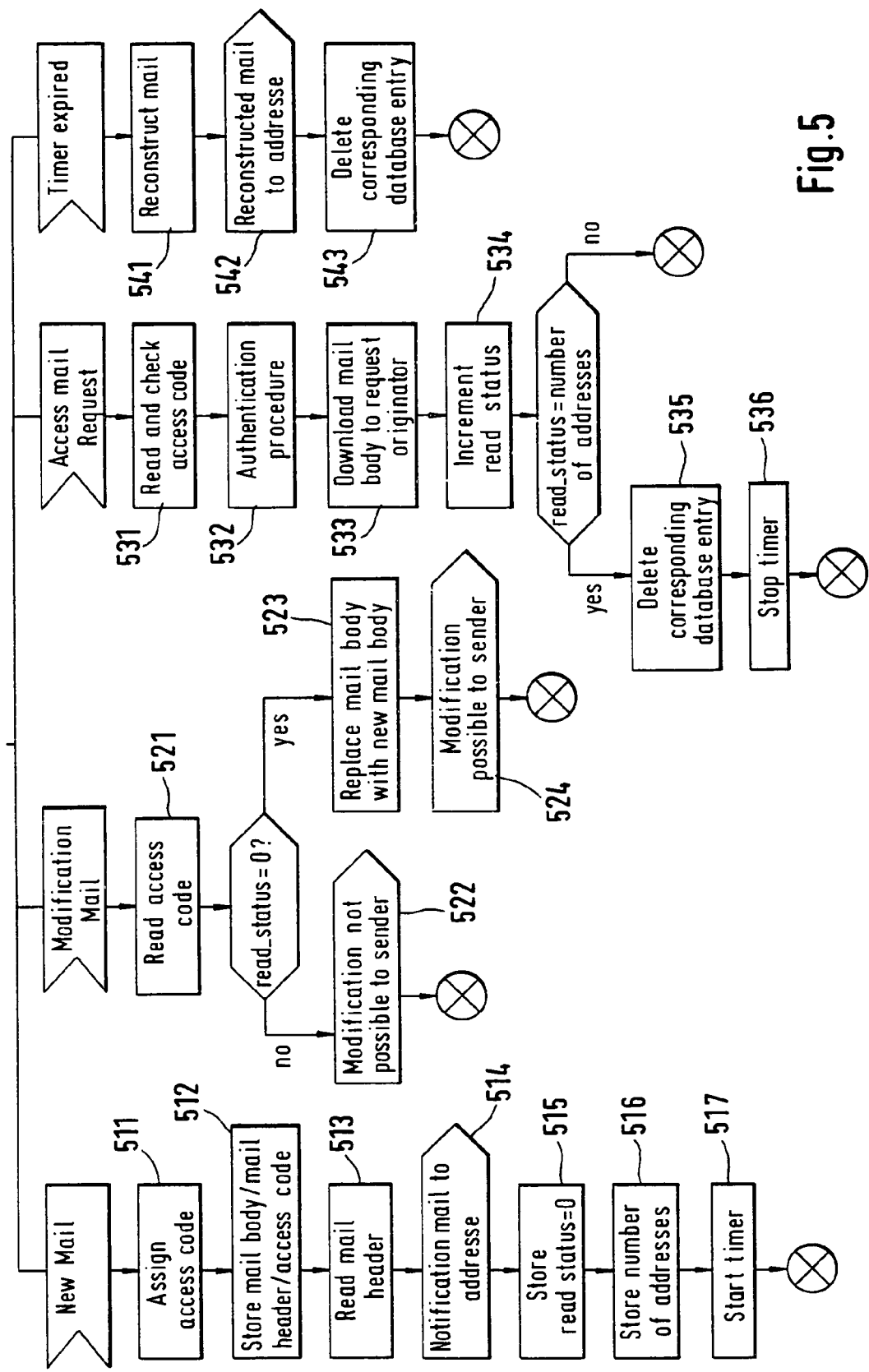
FIG. 5 is a flow chart showing a second implementation of the computer program according to the invention running on the server showed in FIG. 5.

An implementation of a computer program according to the invention dedicated to run on the sever 14 detailed in FIG. 4 is specified thanks to a flow chart showed on FIG. 5. The events handled by the computer program are the reception of an e-mail, the reception of an "access mail" request and the expiration of a timer.

When an e-mail of type "new mail" is received the program executes the following steps:
Step 511: the program assigns an access code to the received e-mail
Step 512: the program stores the e-mail body, the e-mail header and the assigned access code in an entry of the database 42
Step 513: the program retrieves the e-mail header of the encapsulated e-mail and determine the sender of the e-mail and the e-mail addressees
Step 514: the program sends a notification e-mail to the e-mail addressees and returns to state idle
Step 515: the program stores a status storage initialize with null in the corresponding database entry
Step 516: the program starts a timer associated to the e-mail stored in the database entry.

When an e-mail of type "correction mail" is received the program executes the following steps:
Step 521: the program retrieves the access code from the received modification e-mail and accesses the corresponding entry in the database 22
Step 522: the program checks the field status storage in the database entry If the status storage is equal to null, the program executes step 522, if not the program executes step 523 and the following.
Step 522: the program sends a message to the sender of the modification e-mail indicating that the modification is not possible and returns to the idle state.
Step 523: the program replaces the e-mail body stored in the database 42 with a new e-mail body contained in the body of the modification e-mail.
Step 524: the program sends a message to the sender of the modification e-mail indicating that the modification has been properly executed and returns to the idle state.

When an "access mail" request is received the program executes the following steps:
Step 531: the program retrieves the access code from the received message and check if the access code is correct
Step 532: the program executes an authentication procedure to determine if the user providing the access code is one of the addressees of the e-mail associated to the access code.
Step 533: the program accesses the entry corresponding to the access code in the database 42 and downloads the e-mail body to the "access mail" request originator
Step 534: the program increments the status storage of the corresponding database entry
Step 535: the status storage is compared to the number of addressees of the database entry. If they are equal, the database entry is deleted and the program executes step 536. If they are not equal the program returns directly to the idle state.
Step 536: the program stops the timer and returns to the idle state.

When a timer associated to a database entry expires the program executes the following steps:
Step 541: the encapsulated e-mail is reconstructed thanks to the e-mail header and the e-mail body stored in the database 42
Step 542: the reconstructed e-mail is sent automatically to all the addressees who have not read the e-mail yet
Step 543: The corresponding entry in the database is deleted and the program returns to state idle.

The invention claimed is:

1. A method of manipulating a sent e-mail addressed by a sender to a plurality of addressees, said sent e-mail comprising an address header and a body, wherein said method comprises:
routing a modification message over a data network to a server that operates independently from any e-mail processing means associated with each of said addressees and on which at least the body of said sent e-mail is stored, said modification message being sent by said sender and for modifying said e-mail body; and
modifying said e-mail body at said server according to said modification message if said e-mail body has not been accessed on said server by any of said addressees, wherein the modification of said e-mail body at said server in response to said modification message is denied if at least one addressee has accessed said e-mail body on said server, and wherein the modification of said e-mail body occurs at said server independently of any e-mail processing means associated with each of said addressees.

2. A method according to claim 1, wherein said modification of said e-mail comprises deleting said e-mail body or modifying a part of said e-mail body, said sender being informed by said server if said modification has been executed or not.

3. A server able to receive, from a data network, an e-mail comprising an address header and a body and addressed by a sender to a plurality of addressees, wherein said server operates independently from any e-mail processing means associated with each of said addressees, said server comprising:
means for storing at least the body of said received e-mail together with an access code on said server;
means for sending to each addressee a notification message of said e-mail, said notification message containing the access code for accessing said e-mail body;
means for handling a status storage indicating at least whether said e-mail body has been accessed by one of said addressees;
means for receiving a modification message for modifying said e-mail body; and means for modifying said e-mail body according to said modification message, if said e-mail body has not been accessed on said server by any of said addressees, wherein the modification of said e-mail body in response to said modification message is denied if at least one addressee has accessed said e-mail body on said server, and wherein the modification of said e-mail body occurs at said server independently of any e-mail processing means associated with each of said addressees.

4. A server according to claim 3, further comprising means for sending a message to the sender of said modification message to notify the sender if the modification has been executed or not.

5. A server according to claim 3, further comprising means for sending a message to the sender of said e-mail containing said access code associated to said e-mail.

6. A server according to claim 3, further comprising:
means for downloading said e-mail body to one of said addressee providing said access code; and
means for deleting said e-mail body at said server when each one of said addressees has accessed said e-mail body at said server.

7. A server according to claim 3, further comprising:
means for storing the header of said e-mail; and
means for executing an authentication procedure when a user tries to access said e-mail body by providing said access code.

8. A server according to claim 3, further comprising:
means for storing the header of said e-mail;
means for receiving a modification message for modifying said e-mail header only or said e-mail body; and
means for modifying said e-mail header according to said modification message, if said e-mail has not been accessed by any of said addressees.

9. A server according to claim 3, further comprising:
means for storing the header of said e-mail;
means for sending to said addressees an e-mail containing said e-mail header and said e-mail body after a predefined time period; and
deleting from said server said e-mail header and said e-mail body.

10. A computer program product to be executed on a server according to claim 3, said computer program product comprising computer program code means embodied on a computer-readable medium and adapted to perform a method of modifying an e-mail comprising an address header and a body and sent to a plurality of addressees, wherein said method comprises:
storing the body of a received e-mail together with an access code on said server;
sending to each addressee of said e-mail a notification containing the access code for accessing said e-mail body;
handling a status storage indicating at least whether said e-mail body has been accessed by one of said addressees; and
if a modification message for modifying said e-mail body is received, modifying said e-mail body according to said modification message, if said e-mail body has not been accessed on said server by any of said addressees, wherein the modification of said e-mail body in response to said modification message is denied if at least one addressee has accessed said e-mail body on said server, and wherein the modification of said e-mail body occurs at said server independently of any e-mail processing means associated with each of said addressees.

11. A computer program product to be executed on a computer and comprising computer program code means embodied on a computer-readable medium, said computer program code means adapted to perform:
composing a modification message for modifying an e-mail addressed to a plurality of addressees and sent to a predefined server, said predefined server operating independently from any e-mail processing means associated with each of said addressees; and
sending said modification message to said server to modify at least the body of the e-mail sent to and stored on said predefined server if the e-mail body has not been accessed on said server by any of said addressees, wherein the modification of said e-mail body in response to said modification message is denied if at least one addressee has accessed said e-mail body on said server, and wherein the modification of said e-mail body occurs at said predefined server independently of any e-mail processing means associated with each of said addressees.

12. A personal computer equipped with a computer program according to claim 11.

* * * * *

UNITED STATES PATENT AND TRADEMARK OFFICE
CERTIFICATE OF CORRECTION

PATENT NO. : 7,624,146 B1
APPLICATION NO. : 09/667779
DATED : November 24, 2009
INVENTOR(S) : Brogne et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1793 days.

Signed and Sealed this

Fourteenth Day of December, 2010

David J. Kappos
*Director of the United States Patent and Trademark Office*